United States Patent [19]

Sin

[11] Patent Number: 5,153,876
[45] Date of Patent: Oct. 6, 1992

[54] COMMUNICATION PROTOCOL FOR STATISTICAL DATA MULTIPLEXERS ARRANGED IN A WIDE AREA NETWORK

[75] Inventor: Kwai S. Sin, Lane Cove, Australia

[73] Assignee: Digital Equipment Corporation, Pty. Limited, Inc., New South Wales, Australia

[21] Appl. No.: 450,277

[22] Filed: Dec. 13, 1989

[51] Int. Cl.[5] .............................................. H04J 3/02
[52] U.S. Cl. ................................ 370/85.1; 370/85.14
[58] Field of Search .................... 370/85.3, 94.1, 85.15, 370/85.14, 85.1

[56] References Cited

U.S. PATENT DOCUMENTS

| | | |
|---|---|---|
| 4,082,922 | 4/1978 | Chu . |
| 4,093,823 | 6/1978 | Chu . |
| 4,093,825 | 6/1978 | Chu .................................... 370/94.1 |
| 4,332,027 | 5/1982 | Malcolm et al. .................. 370/85.3 |
| 4,342,995 | 8/1982 | Shima .............................. 370/85.15 |
| 4,445,214 | 4/1984 | Reynolds ........................... 370/94.1 |
| 4,455,649 | 6/1984 | Esteban et al. . |
| 4,494,232 | 1/1985 | Dambrackas et al. . |
| 4,521,880 | 6/1985 | Orsic . |
| 4,528,662 | 7/1985 | Floyd et al. . |
| 4,577,313 | 3/1986 | Sy .................................... 370/85.14 |
| 4,584,679 | 4/1986 | Livingston ........................ 370/94.1 |
| 4,628,504 | 12/1986 | Brown . |
| 4,709,365 | 11/1987 | Beale et al. . |
| 4,723,120 | 2/1988 | Petty, Jr. . |
| 4,736,371 | 4/1988 | Tejima et al. . |
| 4,742,484 | 5/1988 | Yanai et al. . |
| 4,745,597 | 5/1988 | Morgan et al. . |
| 4,791,566 | 12/1988 | Sudama et al. . |
| 4,799,215 | 1/1989 | Suzuki . |
| 5,010,547 | 4/1991 | Johnson et al. ..................... 370/94.1 |

OTHER PUBLICATIONS

Networks and Communications Buyers Guide, (Digital Equipment Corporation, Jul.-Sep. 1988), pp. 2.110-2.114 & pp. 2.157-2.158.

Primary Examiner—Douglas W. Olms
Assistant Examiner—T. Samuel
Attorney, Agent, or Firm—Cesari & McKenna

[57] ABSTRACT

A network topography and associated protocol for exchanging data and control information between stations arranged in a daisy-chain wide-area-network (WAN) and a local-area-network (LAN). The protocol includes a circuit layer which routes messages between WAN stations, and a slot layer which routes slots between LAN channels and WAN devices. The protocol uses virtual circuits to route messages between devices. Broadcast messages distribute control information to all circuits. A circuit-specific control message allows passing control information to each circuit. Virtual circuits are established with a broadcast circuit-connect message and disconnected with a broadcast circuit-disconnect message. The maximum message size is regulated in accordance with the transmission speed of links over which a message must travel.

16 Claims, 5 Drawing Sheets

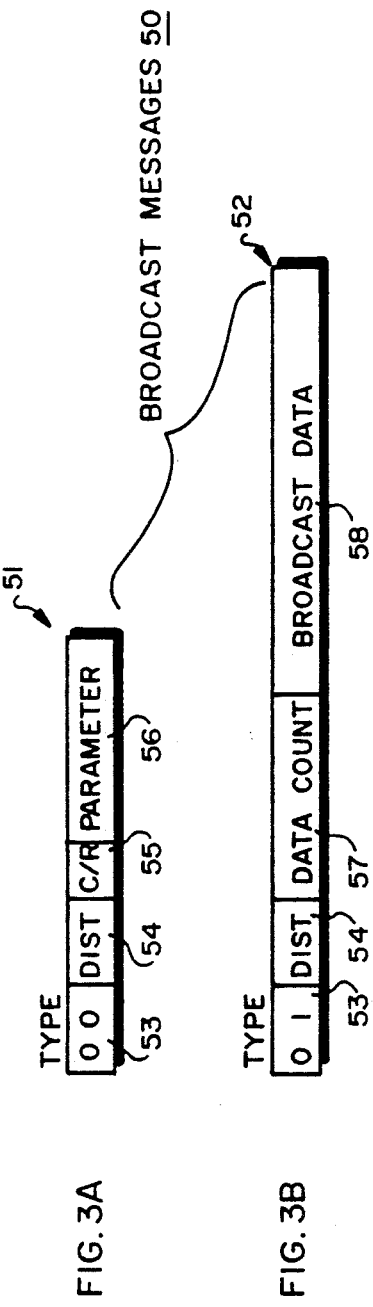
FIG. 3A
FIG. 3B
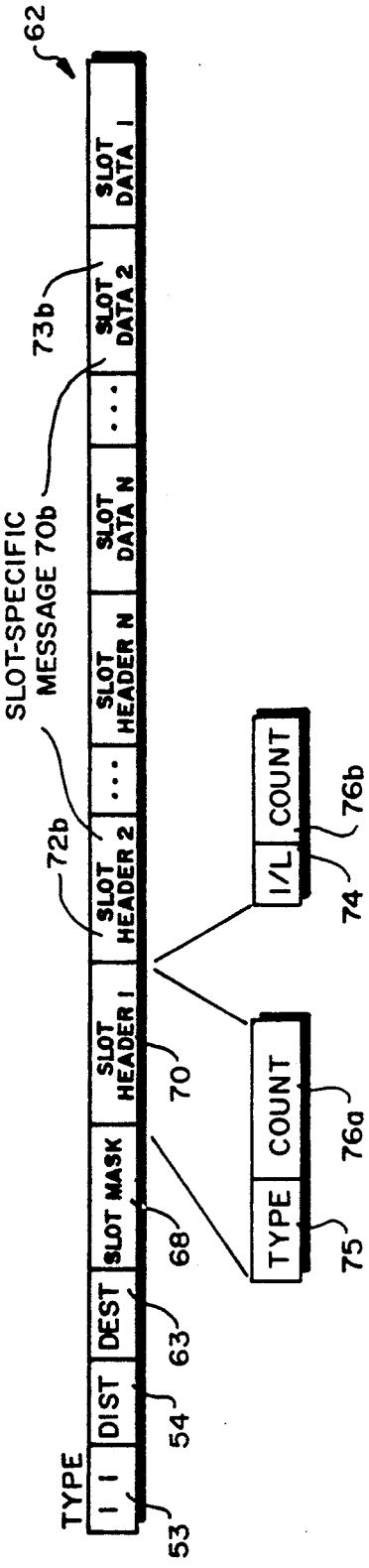
FIG. 3C

COMMUNICATION PROTOCOL FOR STATISTICAL DATA MULTIPLEXERS ARRANGED IN A WIDE AREA NETWORK

FIELD OF THE INVENTION

This invention relates generally to computer networking and particularly to a protocol for data multiplexers arranged in a wide area network.

BACKGROUND OF THE INVENTION

Networks enable computer users to take advantage of their organization's total computing capabilities through information exchange and sharing of resources. Typically, computer resources are arranged into local area networks (LANs) when high speed data transfer is needed within a building or cluster of buildings.

However, the widely-used standard Ethernet LAN has a distance limitation of 2,800 meters between the farthest two nodes. This distance can be extended to several miles by using a device called a LAN bridge to form a so-called extended LAN. A bridge uses appropriate media such as leased telephone lines, fiber optic cables, or microwave repeaters to interconnect two LANs. Bridges are also used to isolate traffic on one section of a LAN from that on another section, and thus bridges also afford a way to improve the performance of a LAN.

Data transmission over longer distances can be accomplished by providing access to remote sites, or stations, through dedicated modems and leased telephone lines. An organization having offices in geographically remote cities, but desiring to have the same interconnection flexibility available in a LAN, is likely to configure its computers into a so-called wide area network (WAN). WANs employ a number of different long-distance communications media such as leased telephone lines, public data networks, and microwave radio or satellite links.

In large organizations, it is now quite common to have a variety of LANs, extended LANs, and WANs. The ideal arrangement for such an organization is to have the user see all of organization's networks function as a single entity, regardless of whether the networks consist of LANs, extended LANs, or WANs, and independently of how these networks are interconnected.

Clearly, a single wide-area network can have a large number of devices on it, the quantity and types of which can vary with time. To operate properly, communications between devices at different locations must include in the messages some indication of the location and identity of the device for which the message is intended. Furthermore, each location must have the capability of determining whether it is the destination designated by the message. Additionally, since the composition of the network can change, devices at the various locations have to be kept apprised of the locations and identities of all or many of the other devices on the network.

Providing all these "housekeeping functions" can exact a significant bandwidth penalty, and it is of course important to keep the percentage of bandwidth dedicated to transmission of actual data, as opposed to housekeeping information, as high as possible. It is also desirable to keep the percentage of hardware costs dedicated to interface equipment as opposed to actual terminal equipment to be as low as possible, preferably by standardization. However, the protocol sometimes requires that certain station- and/or device-specific circuitry be provided so that a device can distinguish messages intended for it from messages intended for other devices on the wide-area network.

SUMMARY OF THE INVENTION

According to one aspect of the invention, each message transmitted over the wide-area network includes a distance field, which the originating station sets to some initial value, typically zero, and which each succeeding station increments before forwarding the message to the next station in a daisy-chain wide-area network. By inspecting this field, a receiving station can identify the station that originated the message.

In accordance with another aspect of the invention, messages intended for a particular destination station, as opposed to messages intended for all stations on the network, additionally include a destination field, which contains a value that gives the distance in "hops" between the originating station and the destination station. To determine whether a receiving station is the destination station for a message that it has received, the receiving station simply compares the destination field with the distance field; if they match, the receiving station is the station for which the message was intended. If they do not match, the receiving station simply increments the distance field and forwards the message to the next station in the daisy-chain network.

The addressing is thus relative; the destination field used to designate a given station differs in accordance with the station that originates the message, and the contents of the distance field used to designate a given originating station differs in accordance with the station receiving the message. The result of this indirect addressing scheme is that the hardware used to implement this aspect of the protocol can be identical from station to station; there is no need for any unique station-identifying code to be hard-wired into the hardware for that station.

In accordance with another aspect of the invention, a message destined for a given station can contain a plurality of "slots" of data, each of which is associated with a different device at the destination station. Rather than including a device-identifying code in each slot to designate the device for which the slot contents are intended, the message simply includes a slot bit mask, which includes one bit for each possible device at the destination station. Each bit indicates whether the message includes a slot for the corresponding device. For instance, if a particular station includes devices A, B, C, and D, and if the second and fourth bits of the slot bit mask indicate the presence of slots but the other two do not, then the station receiving the message "knows" that, of the two slots in the message, the first is intended for device B and the second is intended for device D. This simple mechanism not only eliminates the need for bandwidth-consuming multi-bit device identifiers but also eliminates the need for a blank position-holding slot for every device for which the message does not include data.

BRIEF DESCRIPTION OF THE DRAWINGS

The above and further advantages of the invention may be better understood by referring to the following description in conjunction with the accompanying drawings, in which:

FIG. 3A through 3C are various message formats in accordance with the invention;

DETAILED DESCRIPTION OF AN ILLUSTRATIVE EMBODIMENT

Figure 1:
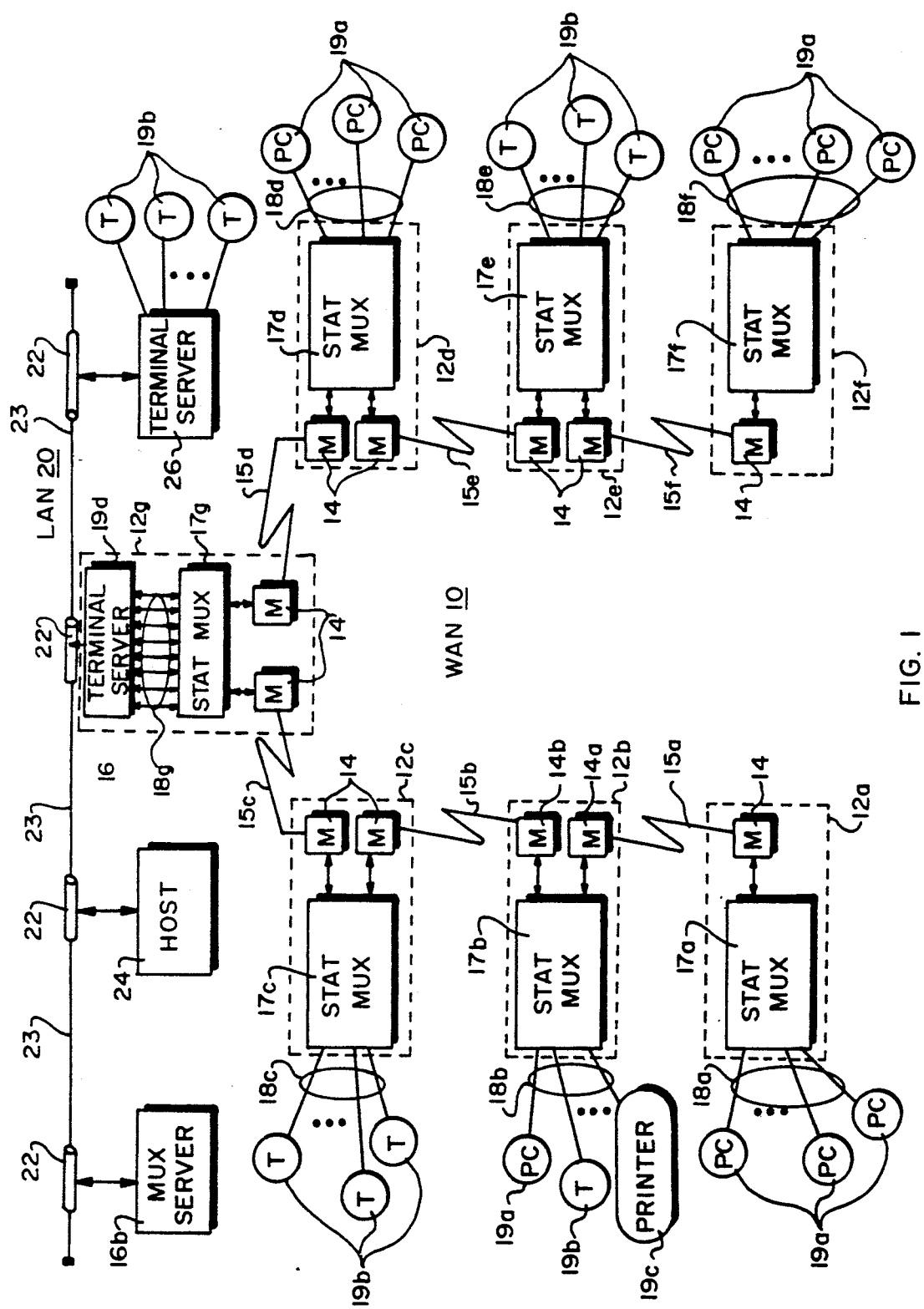
FIG. 1 is a block diagram of a wide area network (WAN) in which a data-exchange protocol in accordance with the invention operates.

The following detailed description of the invention begins with a discussion of the topology of a wide area network (WAN) and then proceeds to a discussion of the protocol layers and message formats. An exemplary WAN station's circuit layer which operates in accordance with the protocol is then described. In the discussion, common reference numerals designate like parts throughout the drawings, with numerals alone indicating parts generically, and numerals followed by letters indicating specific instances of the part generically designated by the numeral alone.

To understand the arrangement of a WAN in which the protocol operates, turn attention in particular now to FIG. 1. The WAN 10 interconnects devices located at a number of geographically remote stations 12a, 12b, 12c, . . . , and 12f (referred to collectively as stations 12). The WAN 10 is a duplex, daisy-chain network, in which connection between stations 12 is accomplished by the use of duplex modems 14 and synchronous data links 15. Thus, an exemplary station 12b has a pair of modems—an upper modem 14b connected to a neighboring station 12c, and a lower modem 14a connected to another neighboring station 12a. Station 12b communicates with station 12a over data link 15a and with station 12b over data link 15b. Stations at the end of the chain, such as stations 12a and 12f, use only one modem 14 since they need only communicate with one neighboring station.

Although stations 12a and 12b are referred to as "neighbors," they may actually be thousands of miles apart—and station 12d may actually be physically located closer to station 12a than to station 12b. The WAN protocol accommodates data links 15 of different speeds. The number of data links 15 in the daisy-chain—and hence the number of stations 12 in the WAN 10—is constrained only, as will be seen, by the length of address fields in certain control messages.

Data links 15 use any suitable media for transmission of data over long distances, such as leased telephone lines. An appropriate synchronous data link protocol, such as High-Level Data Link (HDLC) protocol, is used to coordinate transmissions over the data links 15.

Data concentration equipment at each station 12 connects a number of user devices 19 to the WAN 10 through a like number of ports 18. In station 12b, for example, a data concentration device such as a statistical multiplexer (stat-mux) 17b combines data originating at devices 19a, 19b, . . . , and 19c and couples it to the data links 15. Stat-mux 17b also recognizes data on both of the data links 15 intended for one of the devices 19 located at station 12b and routes it to the proper device 19. Exemplary devices 19 are a personal computer 19a, a data terminal 19b, and a printer 19c. Other types of devices 19 such as host computers can also be accommodated. Devices 19 are typically asynchronous-type communications devices.

The exemplary stat-mux 17b multiplexes data in accordance with a demand multiplexing scheme, which breaks up the data streams from the devices 19 into small groups of bytes called slots. The size of the slots allocated to each device 19 is determined according to the demands of the various devices 19 in accordance with known techniques. A stat-mux periodically scans each of its ports and forms a separate slot from the data available at each port. A group of slots destined for the same station is then assembled into a message, and the message is queued for transmission over the WAN 10. If a port is not busy at a particular time, a slot for that port is not allocated in the message, so the WAN 10 will never waste time waiting for idle devices. The protocol on the WAN 10 respects and preserves this demand multiplexing scheme.

Other stations such as station 12g use a multiplexer-server (mux-server) 16a, which includes a stat-mux 17, and a terminal server 19d, in the place of a stat-mux 17 and other types of terminals 19 to connect associated ports 18g to the LAN 20 through a transceiver. The mux-server 16a appears as a terminal server node to the LAN 20 while appearing to the WAN 10 as a single station 12 with multiple ports 18.

Figure 2:
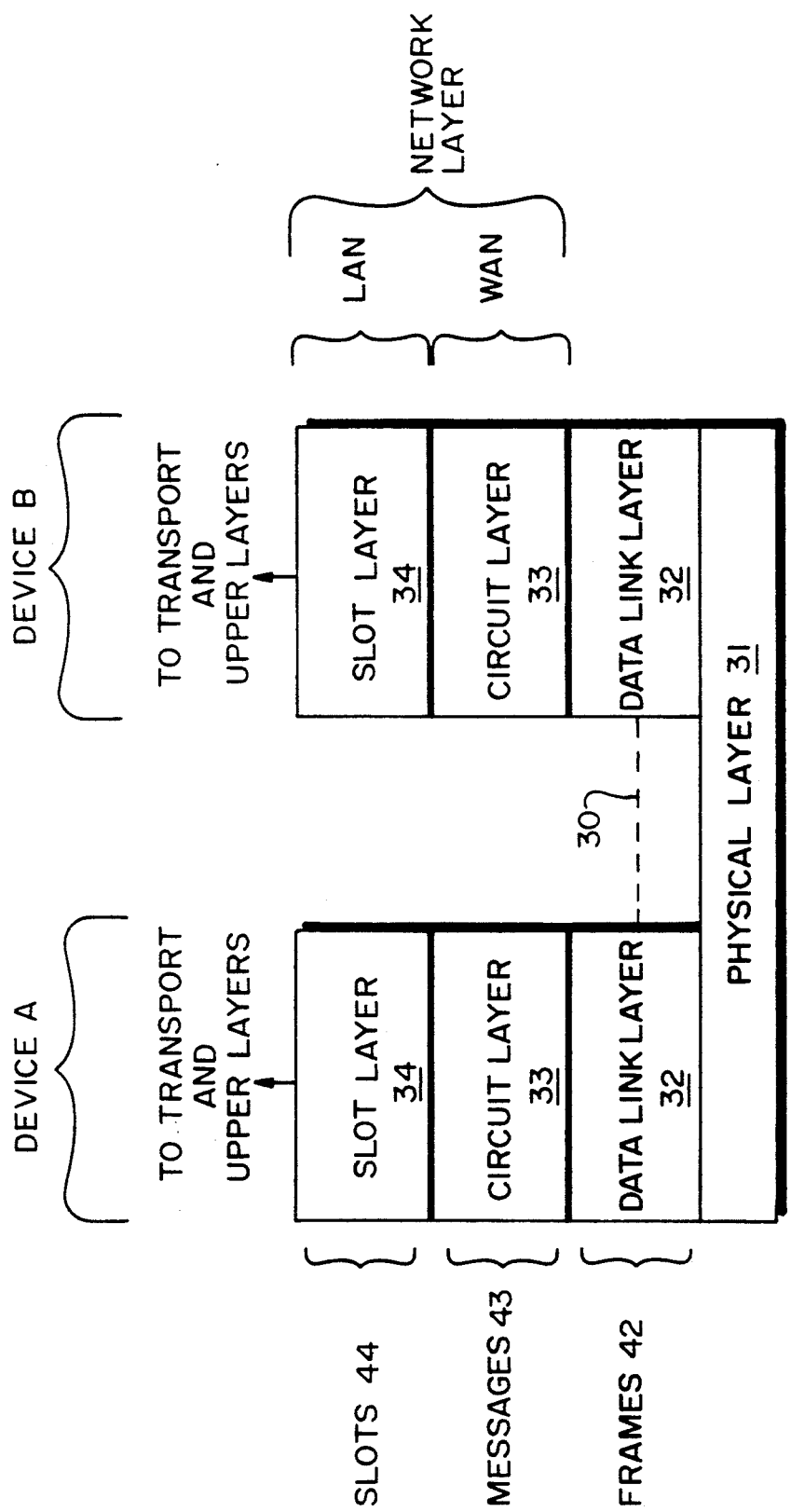
FIG. 2 is a diagram showing the various layers of the protocol.

As shown in FIG. 2, the protocol layers for WAN 10 include at least a physical layer 31, a data link layer 32, a circuit layer 33, and a slot layer 34. The lowest, or physical layer 31 is the physical interconnection between a first device A and a second device B. In accordance with the Open Systems Interconnect (OSI) model proposed by the International Organization for Standardization (ISO), the physical layer concerns the transmission of unstructured bit streams over the physical media, including the mechanical and electrical specifications to access the media. The type of physical layer used is not critical to the operation of this invention.

The data link layer 32, as in the OSI model, provides for low-level logical interconnection 30 between devices A and B. The data link layer 32 sends blocks of data, called frames 42, with the necessary error recovery, flow control, and synchronization to accomplish reliable transfer of information over the link. Again, the type of data link layer used is not critical to the operation of the invention. The widely-used High-Level Data Link Control (HDLC) is one suitable protocol.

The circuit layer 33 and slot layer 34 together perform the functions of the network layer in the OSI model, also known as a routing layer, such as in Digital Equipment Corporation's (DEC's) Digital Network Architecture (DNA). The network layer is concerned with providing independence from the data transmission and switching technologies used in the network; it establishes and maintains connections while routing data over the network. Additional layers may be placed above the network layer, such as the OSI model's transport, session, presentation, and applications layers, or DNA's transport, session control, network application, and user layers.

The network layer in accordance with the invention includes two independent layers. The circuit layer 33 is concerned with connection and data routing between stations 12. The slot layer 34 is concerned with connection and data routing between ports 18 and/or channels 22. As will be understood shortly, the operations of the slot layer 34 are concealed from both the data link layer 32 and the circuit layer 33. Likewise, the operations of the circuit layer 33 are concealed from the data link layer 32 and the slot layer 34.

The elemental data unit passed at the circuit layer 33 is a message 43. The elemental data unit at the slot layer is a slot 44. As previously mentioned, a message 43 is built from a series of slots to be transmitted to devices in the same destination station, the number of slots in any given message depending upon the number of ports at the destination station for which ports at the originating station have data.

Before discussion of different types of allowed message and slot formats, a general discussion of the operation of circuit layer 33 and slot layer 34 will be helpful. Returning briefly to FIG. 1, consider that stations 12 share the daisy chain network formed by links 15 by using message-switching at the circuit layer 33. In particular, a virtual circuit scheme is used to route messages, a unique virtual circuit being provided between every station 12 and every other station 12. As discussed more fully in connection with FIGS. 5A and 5B, a means to automatically connect and disconnect virtual circuits upon establishment of a link 15 is also afforded.

The virtual circuit methodology is provided by having each message intended for a specific station include a source and destination address and by insuring that messages are always transmitted—and thus received—in sequence. As each message is received at a particular station 12b from one of the links, say link 15a, the message is checked, in a manner that will be explained below, to determine whether this receiving station is the message's ultimate destination. If so, the message is disassembled into slots, and the slots are routed to the proper ports 18. If not, the message is routed back onto the WAN 10 over the other data link 15b associated with the station 12b. Thus, any message will ultimately reach its destination, although it may have to pass through several stations (i.e., it may take several "hops").

Source and destination addresses are relative, which greatly simplifies the handling of WAN message traffic. The relative addressing scheme divides the virtual circuits associated with any one station—and thus the stations at the other ends of those circuits—into two groups in accordance with the data links with which they are associated. For example, one of the groups of virtual circuits associated with station 12b is associated with data link 15a, while the other is associated with data link 15b.

A message with a destination address of "0" is one that is not to be routed through the WAN 10, but rather to other devices 19 at the same station 12b. Address "1" indicates the station at the next hop, address "2" the one after that, and so forth. Thus, the number assigned by a station 12 to a particular virtual circuit indicates the distance in hops to the corresponding station at the other end of the virtual circuit. For example, the addresses assigned to virtual circuits by station 12b are such that virtual circuit address "2" associated with data link 15b is the circuit used to pass data to station 12g, and virtual circuit address "1" associated with data link 15a is the circuit to station 12a.

In addition to the destination relative address, each message also includes a source relative address in the form of a distance indicator which a receiving station uses in connection with the destination relative address to determine whether that receiving station is the destination. Specifically, as a message travels around the WAN 10, its distance indicator is incremented by every station that forwards it. In this manner, the distance indicator tells how many hops away the source is, and it will equal the destination address when the message reaches its intended destination. This mechanism simplifies the station hardware; there is no need to provide the connection mechanism at each station with a unique address register, for instance, so every station can use exactly the same connection mechanism.

Each message contains data from one or more ports associated with only one station, and that data must be destined for one or more ports associated with only one other station. In addition, messages are always processed in the order in which they are received. As a result, message-level sequence numbers are not used or needed.

Considering the protocol more particularly, four exemplary messages are shown in FIGS. 3A through 3D. Each message is comprised of a number of fields, the number of bits in a field depending upon its function.

The first portion of every message includes a type field 53. The type field 53 identifies the kind of message and thus the format of the fields which follow. All messages also include a distance field 54, which is incremented by every station when a message is received. The distance field 54 has several functions: to indicate whether a message has reached its desired destination, to aid in the queuing of messages to be forwarded to other stations 12, and to identify the source of the message.

Each type field 53 includes at least two bits, one bit (the most-significant bit in the examples of FIGS. 3A–3C) indicating whether the message is a broadcast message, i.e., one intended for all stations, or a circuit-specific message, i.e., one intended for a specific station.

If the message is a broadcast message, the second bit of the type field is a "control or data" indicator, whose meaning will be explained below. In a circuit-specific message, the second type-field bit is a "circuit slot bit mask," which indicates whether, in addition to the usual "channel slots," which contain information for individual devices at the station, the message includes a "circuit slot," which contains information for the destination station itself.

One of the uses of a broadcast message 50 is to provide the mechanism by which a station 12 declares its availability to all other stations 12 on WAN 10. Broadcast messages can also be used to distribute other information such as network configuration data and service information. The station 12 originating a broadcast message 50 must send it on both links 15 to which the station 12 is connected to insure that each station 12 in the WAN 10 will receive the broadcast message 50.

FIG. 3A depicts a broadcast message 51 of the control type. Message 51 includes command-response and broadcast-parameter fields 55 and 56, respectively. A broadcast-control message 51 is always either a command or a response; in accordance with the protocol, a station that receives a command-type broadcast-control message from an originating station may send a response-type broadcast control message back to that station. The command-response field 55 indicates whether a particular message is a command or a response.

The broadcast-parameter field 56 has contents whose meanings are predetermined by the protocol. One bit of the broadcast-parameter 56 is used to indicate whether the broadcast-control message 51 is a circuit-connect command or a circuit-disconnect command, and other bits indicate, for example, the number of ports 18 available at the station 12 originating a circuit-connect command. In a disconnect command, the other parameter bits indicate the reason for the disconnect command. Further details of the circuit-connect and circuit-disconnect process will be described in connection with FIGS. 5A and 5B.

FIG. 3B depicts the format of a broadcast-data message 52. In addition to the type and distance fields 53 and 54 already described, a broadcast-data message 52 includes a count field 57 and broadcast-data field 58. The count field 57 indicates the length (such as in bytes) of the broadcast-data field 58; the total length of a broadcast-data message 52 is variable. Broadcast-data messages 52 provide a mechanism for distribution of WAN-wide status and configuration information to all stations 12. Like the parameter field 56, the broadcast-data field contains information for all of the stations, but the meanings of its contents are assigned by the user, not predetermined by the protocol.

FIG. 3C shows the format of a circuit-specific message 62. It includes a type field 53, a distance field 54, and a destination field 63. Distance field 54 and destination field 63 provide the means for channeling messages only to intended destinations in accordance with the relative-addressing mechanism previously described.

The message 62 also includes circuit-level data destined for the destination station that field 63 designates. As mentioned previously, each circuit-data message 62 can include data intended for one or more ports. Thus, each circuit-data message 62 can include a plurality of port-specific messages 70. This is accomplished by including a slot mask field 68, a plurality of slot header fields, and a corresponding plurality of slot data fields, each of which corresponds to a port at the destination station. An exemplary slot-message 70b thus includes a slot header field 72b and slot data field 73b. The number of bits in the slot mask 68 equals the maximum number of channel slot-messages 70 allowed in each circuit-data message 62. This maximum number is preferably the same as the maximum number of ports 18 allowed to be connected to a particular station 12. Thus, if slot mask 68 is a byte long, up to eight ports 18 can be supported at each station 12. If a bit in the slot mask 68 is set, that indicates to the receiving station that the particular circuit-data message 62 has a slot-message 70 for the corresponding port 18.

The use of slot mask 68 allows each circuit-data message 62 to include a slot-message 70 for every port, when needed, while still allowing each slot-message length to vary from message to message with no need to allocate spaces for slots when they are not busy. This minimizes overhead and eliminates the need for the circuit layer 33 to know the details of the message formats used by the slot layer 34. The slot-mask arrangement also minimizes overhead by eliminating the need to include an identification code in the message for each port for which slot data are intended; the slot mask uses only a single bit for each possible station port to identify the destination ports for which the message contains data.

Slot headers are of fixed lengths and positioned together in ascending numerical order after the slot mask 68. For reasons of possible protocol expansion not relevant here, the slot data fields are positioned in reverse numerical order starting at the right-hand side of the circuit-data message 62. The slot data for the first slot in the message, "slot data 1," is located by using the field length read from the corresponding "slot header 1," and the slot data for other slots is located similarly.

There are two types of slot headers: circuit slot headers, such as header 72b, and channel slot headers, such as slot 72a. A circuit slot header contains an intermediate/last indicator 74 and a slot-data-count field 76, whereas a channel slot header contains a slot-data-type field 75 and a slot-data-count field 76.

Intermediate/last indicator 74 tells the receiving station 12 whether the present slot contains the last data in the data stream for its destination device; i.e., an intermediate/last indicator value of "0" indicates that the slot is the first or intermediate segment in a data stream, while an intermediate/last indicator 74 value of "1" indicates that the slot is the last. The slot-data-count 76 provides a way to communicate the length of each slot-message 70.

The slot-data-type field 75 affords a mechanism for passing high level protocol information to upper layers, such as transport-layer protocol and session-layer protocol. Specifically, the slot data type 75 of "00" indicates user data. The slot data type 75 of "01" indicates out-of-Oband control data that has to be synchronized with the user data. The slot data type 75 of "10" indicates interrupt data which is used for session connection. The slot data type 75 of "11" indicates management functions such as data compression. An example of such a protocol is Digital Equipment Corporation's Local Area Network Transport (LAT) protocol described in U.S. Pat. No. 4,823,122 to Grey, which issued on Apr. 18, 1989, and is hereby incorporated by reference. Type "00," user data, corresponds to LAT data_a stream; type "01" corresponds to LAT data_b stream; and type "10" corresponds to LAT Attention Data.

Figure 4:
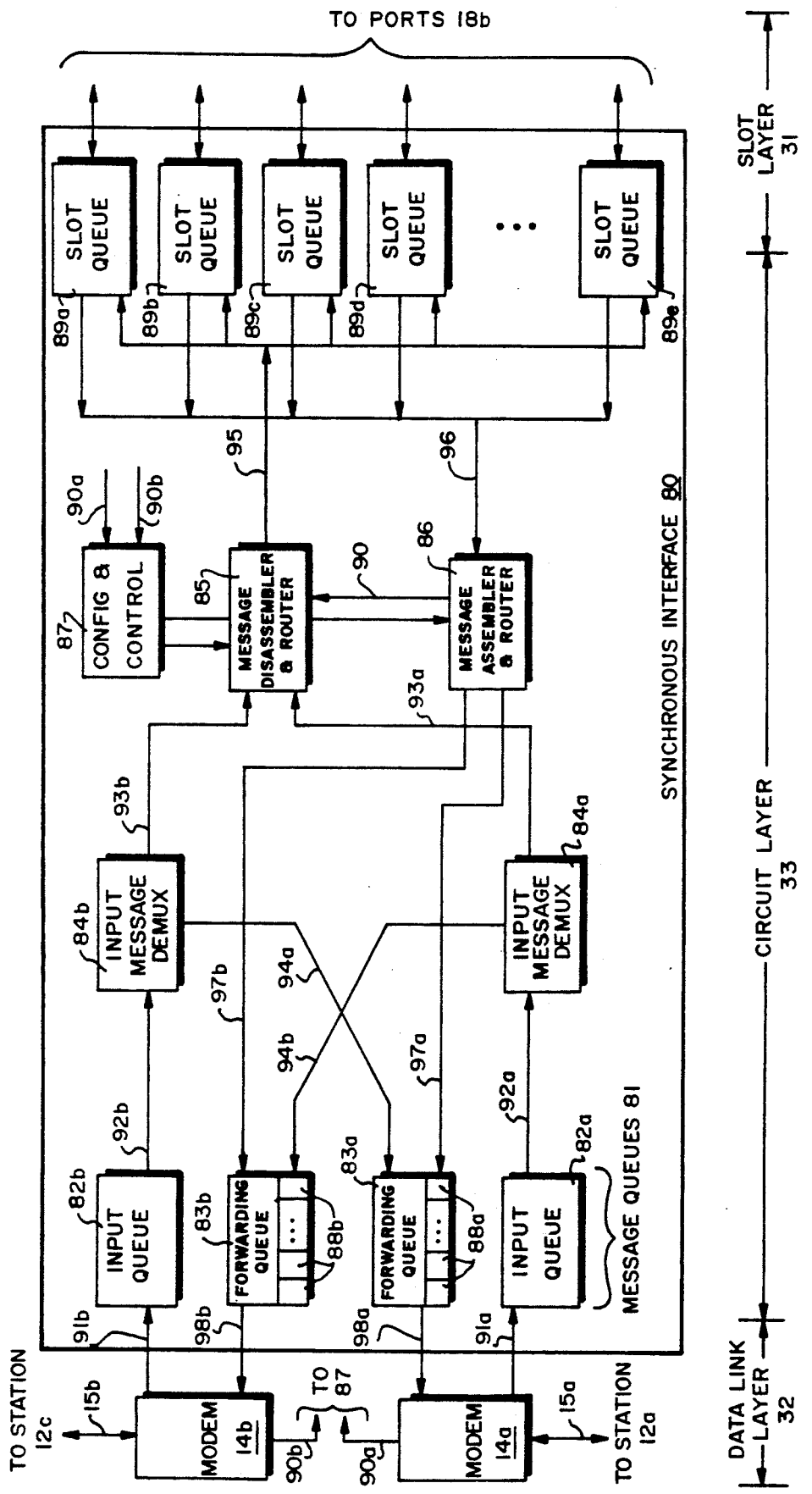
FIG. 4 is a block diagram of a WAN station which operates in accordance with the protocol.

FIG. 4 is a detailed block diagram of the apparatus 32 at each station 12 for implementing the circuit and slot layers of the protocol. The apparatus shown is for the stat-mux 17b which is part of station 12b; a similar apparatus is located at all other stat-muxes 17 (FIG. 1).

As FIG. 4 shows, station 12b includes a synchronous interface 80. Synchronous interface 80 is coupled to a pair of modems, the lower modem 14a connecting station 12b to data link 15a, the upper modem 14b connecting station 12b to data link 15b. The modems 14 are full-duplex, and thus exemplary modem 14a passes incoming data (that is, data received at station 12) from data link 15a to a modem output bus 91a, and passes outgoing data (that is, data output by station 12) from a modem input bus 98a to the data link 15a. Likewise, upper modem 14b presents incoming data from link 15b to modem output bus 91b and passes outgoing data from modem output bus 98b to link 15b. Modems 14 perform the functions of the data link layer 32 and thus handle the formatting of outgoing messages into frames and the stripping of frame information from incoming frames to provide incoming messages.

Synchronous interface 80 includes a pair of input queues 82a and 82b, a pair of forwarding queues 83a and 83b, a pair of input-message demultiplexers 84a and 84b, a message-disassembler-and-router 85, a message-assembler-and-router 86, a configuration-and-control circuit 87 and a plurality of slot queues 89.

The input queue 82a receives incoming data from modem-output bus 91a and provides it along an input-queue bus 92a. Input queue 82a is a first-in-first-out (FIFO) memory and operates as an input buffer for incoming messages.

Incoming messages on input-queue bus 92a are then handled by the input-message demux 84a. Input-message demux 84a determines which incoming messages from data link 15a are intended for station 12b. As previously mentioned, this is done by comparing the distance field 54 to the destination field 63 in circuit messages 62 (FIG. 3C). Any circuit message 60 so determined as having reached its destination is passed for further processing onto a local-circuit-message bus 93a. Messages not intended for this station 12b are passed to forwarding-circuit-message bus 94b so that they will be forwarded to the next station 12 in the chain. Input-message demux 84a also routes all broadcast messages 50 to station 12 by automatically placing them on the local circuit message bus 93a, and also forwards them to the next station 12 by placing them onto the forwarding circuit message bus 94b as well.

Similarly, input queue 82b and input-message demux 84b route incoming circuit messages 60 and incoming broadcast messages 50 received from data link 15b onto a local-circuit-message bus 93b and a forwarding-circuit-message bus 94a.

Message-disassembler-and-router 85 thus operates on messages as they are received from either of the local circuit message buses 93. Circuit-data messages 62 are separated into slot-messages 70, as previously described in connection with FIG. 3C. Slot-messages 70 are then sent over a slot output bus 95 to their corresponding ports 18 as designated by the slot mask 68. There is a bi-directional slot queue 89 associated with each port 18 available at station 12b.

As was stated above, the second bit of the type field 53 in a circuit-specific message is a circuit slot bit mask. If this bit is a "1," then the message includes a slot whose controls are intended, not for one of the devices 19, but rather for the control circuitry of the station itself. Such slots are routed to control circuit 87, which maintains status information for each virtual circuit. Broadcast messages 50 are also passed to control circuit 87, which forwards commands to the message-disassembler-and-router 85 or to message-assembler-and-router 86. Control circuit 87 also receives link status information from status lines 90a and 90b output by modems 14a and 14b, respectively. In this manner, control circuit 87 can automatically initiate a circuit connect command upon establishment of a link and automatically issue disconnect commands when the link is disconnected.

Outgoing messages from station 12 are assembled and handled as follows. Periodically, message-assembler-and-router 86 scans the slot queues 89 at each port 18 and builds circuit-data messages 62 in the format of FIG. 3D. Any given scan of the slot queues 89 may require several messages to be assembled, the number of messages depending on the number of different destination stations for which they are intended as well as on the message sizes permitted in the different virtual circuits. The information from the slot queues designates the port 18 to which the information is to be sent, and, from information passed to it by the control circuit 87, message-assembler-and-router 86 finds the destination address assigned to the destination port's station and places that address in the destination field 63 of circuit-data message 62. Message-assembler-and-router 86 may also receive outgoing broadcast messages 50 or circuit-control messages 61 from control circuit 87.

Messages that are only to pass between two ports 18 located at the same station 12b, and that thus need not pass over the WAN 10, are sent along an intra-circuit bus 90 to message-disassembler-and-router 85.

The messages generated by message-assembler-and-router 86 and intended for a remote device 19 are placed on one of the new-message-forwarding buses 97a or 97b, depending upon whether the destination station is accessed through the upper data link 15b or the lower data link 15a. The control circuit 87 downloads this information to the message-assembler-and-router 86 as part of the circuit establishment procedure.

Exemplary forwarding queue 83a includes a number of outgoing message queues 88, each of which is associated with a different possible value of the message distance field. The total number of queues is equal to the number of possible stations 12 on the WAN 10. Forwarding queue 83a receives messages both from the forwarding circuit message bus 94a and from the new message forwarding bus 97a.

Each message received at forwarding queue 83a has its distance field 54 examined. The message is then placed at the end of the outgoing message queue 88 associated with that distance field 54. In effect, then, messages received from a particular source station are always placed in the same outgoing message queue 88.

The outgoing message queues 88 are then periodically scanned so that their outputs are time-demand-multiplexed onto the modem input bus 98a. Specifically, each outgoing message queue 88 is examined in turn, and one message is extracted from each queue containing a message and is placed onto modem input bus 98a. If the outgoing message queue 88 has no message, then it is skipped, and the time slot is allocated to the next outgoing message queue 88 having outgoing data available.

Forwarding queue 83a insures that one message from each station having a message to send is transmitted in turn. This keeps the associated link 15a from ever being idle if there is outgoing data available from any port 18, but it still results in a fair sharing of the data link 15a among all possible message sources, whether the source is this station 12b or other stations 12.

The control circuit 87 typically allocates message traffic in proportion to the speeds of the links on which each message travels and it typically does so by simply adjusting the allowable message size for each virtual circuit when it is first connected. The message size is selected so that the circuit delay time (i.e., transmission time) of a maximum-length message is independent of link speed. Faster links are allowed to pass longer messages, and slower links must pass shorter messages. The maximum message size for a given virtual circuit is determined by finding the smallest of the maximum message sizes for all of the links 15 over which messages in that virtual circuit must pass. The control circuit typically obtains the necessary information concerning link speed through data-type broadcast messages or through circuit slots of circuit-specific messages sent under the control of user-provided firmware separate from the protocol of the present invention.

Upon establishment of a logical link, a modem such as modem 14a (FIG. 4) sends a signal on line 90a to inform the control circuit 87 that a new link exists. A broadcast circuit-connect-command message is then initiated by the station 12b. A circuit connect message is a broadcast-control message 51 (FIG. 3A) in which the broadcast parameter 56 identifies the message as a circuit-connect message and preferably also indicates the number of ports available on the originating station. Upon the loss of a link, the signal on line 90a informs the control circuit 87 of the loss, and station 12b thereupon broadcasts a circuit-disconnect-command message. The circuit-connect commands always occur in command/response pairs.

Figure 5B:
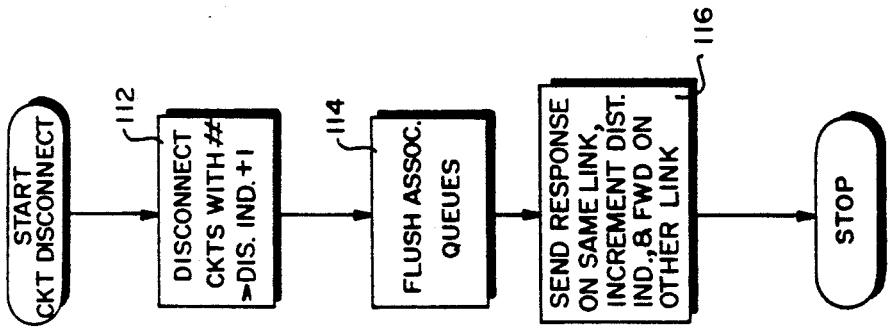
FIGS. 5A and 5B are flowcharts of the operation of the WAN station upon receipt of a circuit connect and circuit disconnect message, respectively.
Figure 5A:
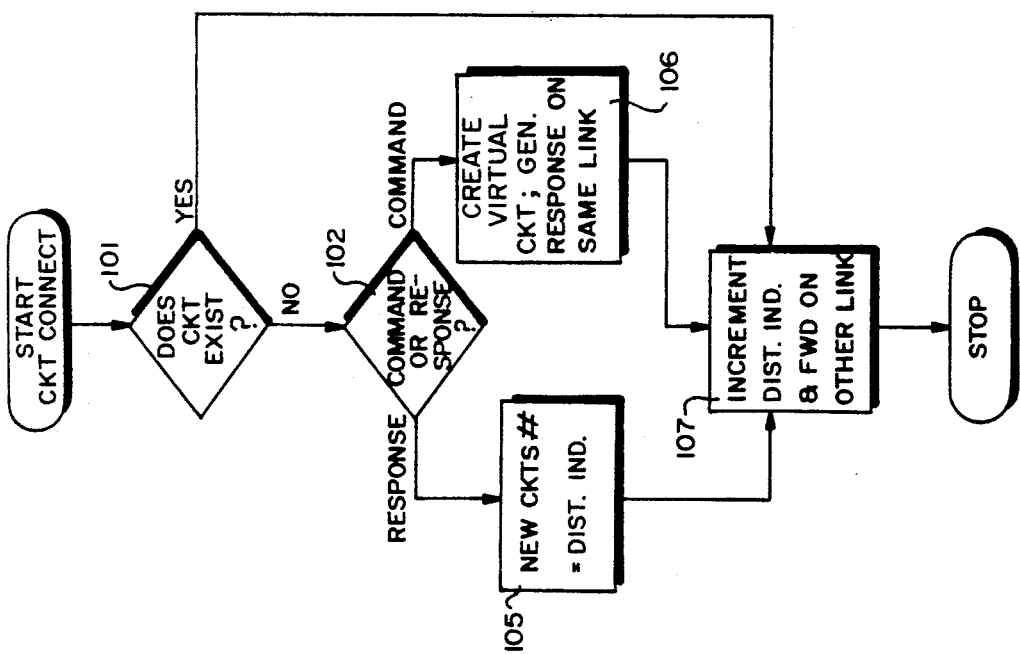

FIGS. 5A and 5B are flow charts of the virtual circuit connect and disconnect procedures, respectively. As far as the transport and higher layers are concerned (FIG. 2), the establishment of virtual circuits is automatic upon link setup and disconnect. It requires no interaction between users on the ports.

The control circuit 87 in each station 12 processes circuit-connect messages in the manner depicted in FIG. 5A. As blocks 101 and 107 of FIG. 5A show, if a virtual circuit already exists between the receiving station and the originating station, then the distance field 54 is incremented, and the circuit-connect message is forwarded over the other link, i.e., not over the link from which the message was received.

If the circuit does not exist, then in step 102 the circuit-connect message is examined again. In particular, if the command/response field 55 indicates that the message is a command, the receiving station creates its end of a virtual circuit and transmits a circuit-connect response message over the link on which it received the circuit-connect command, as block 106 indicates. The response message tells the command-originating station to create its end of the virtual circuit being established between it and the station that sent the response. If the received circuit-connect message is a response, the routine proceeds to step 105, in which the receiving circuit creates its end of a virtual circuit with the response-originating station.

Regardless of what else the routine has done, a station not at one of the ends of the network will always proceed to step 107, in which it increments the distance indicator of the received message and forwards it on the other link to inform the rest of the WAN 10. This is true even of the station that originated the command message to which the received message is the response. The reason for this is that the establishment of the new link may be adding not only the station that originated the connect command but also a number of other stations beyond it. By forwarding the responses received from links on both sides of it, the command-originating link enables all of the stations to be apprised of the presence of all of the other stations.

Processing of a circuit disconnect message occurs as in FIG. 5B. First, in step 112, upon receipt of a circuit-disconnect-message at the proper destination, the control circuit 87 disconnects the virtual circuits with which there is no longer any communication. Specifically, each virtual circuit that connects the receiving station to a station beyond the command-originating circuit must be disconnected, and the control circuit 87 is so notified. The control circuit 87 therefore shuts down all circuits whose circuit numbers exceed the contents of the distance field by more than one. Next, the associated outgoing message queues 88 are informed of this disconnect in step 114. Finally, the distance indicator is incremented, and the circuit disconnect message is forwarded on the other link to inform the other stations of this virtual circuit's status.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A network station adapted for connection into a network that connects a plurality of stations in series and further adapted for connection to a device associated therewith for reception therefrom of slot data together with an indication of the destination, at one of the other stations, for which the slot data are intended, the network station comprising:

A. means for forming a message containing the slot data, a distance field containing a predetermined initial value, and a destination field containing a value indicating the number of stations through which the message must pass before reaching a destination station;
   B. means for transmitting over the network the message so formed;
   C. means for receiving over the network messages that include a distance field; and
   D. means for incrementing the value in the distance field of a received message and forwarding the received message containing distance and destination fields, only if the values in the distance and destination fields are not equal.

2. A network station adapted for connection into a network that connects a plurality of stations in series and further adapted for connection to a device associated therewith for reception therefrom of slot data and an indication of the destination, at one of the other stations, for which the slot data are intended, the network station comprising:

A. means for forming a message containing the slot data, a destination field containing a value indicating the number of stations through which a message must pass before reaching a destination station, and a distance field containing a predetermined initial value;
   B. means for transmitting over the network the message so formed;
   C. means for receiving over the network messages that include distance;
   D. means for incrementing the value and the distance field of a received message and forwarding it along the network; and
   E. means for forwarding to an associated device connected thereto slot data in a received message that includes destination and distance fields, only if the values in the destination and distance fields are equal.

3. A network station as in claim 1 wherein at least one of the stations provides communication between the network and a plurality of devices associated with that station, the network station being further adapted for connection to a plurality of devices associated therewith (a) for reception therefrom of a plurality of slots of data intended for (i) a plurality of devices at one of the other stations and (ii) respective destination indications of a plurality of destinations, at one of the stations, for which respective slots are intended and (b) for forwarding thereto of slots of data received from the network, the network station additionally comprising:

E. means for forming messages, each of which includes
      (i) a plurality of slots of data received from the devices, the contents of each of the slots being intended for a different device associated with a single network station located elsewhere on the network, and (ii) a slot mask indicating the presence of respective slots corresponding to the destinations indicated by the destination indications that it has received;

F. means for transmitting the message so formed over the network;

G. means for receiving from the network a message containing a slot mask and data organized in slots whose contents are intended for a plurality of the associated devices; and H. means for forwarding the contents of the slots of the received message to associated devices in accordance with the contents of the slot mask.

4. A network station (12b) adapted for interconnection in a network (10) with other network stations (12), the network (10) formed by interconnecting network stations (12) using a plurality of data links (15) in a daisy chain, the network station (12b) communicating with other network stations (12) by exchanging circuit-specific messages (62) over the data links (15), the network station (12b) also connected to a plurality of terminal ports (18b), the network station (12b) thus interconnecting the plurality of terminal ports (18b) to other terminal ports (18) associated with other network stations (12), and the terminal ports (18b) communicating with one another by exchanging slot-specific messages (70), the network station (12b) comprising:

A. means (86), (89) connected to receive slot-specific messages (70) from the plurality of terminal ports (18b), for assembling circuit specific messages (62) therefrom, each circuit-specific message (62) including slot specific messages intended for transmission to one or more terminal ports (18) associated with a single destination network station (12), and each circuit-specific message (62) including a destination address field (63) and a distance indicator field (54), the destination address field (63) indicating the number of network stations (12) in the daisy chain through which the circuit-specific message (62) must pass to arrive at the destination network station (18);

B. means (86), (83), (14) for routing the circuit-specific messages (62) assembled by the means (86), (89) for assembling circuit specific messages onto one of the data links (15a), (15b); and C. means (82), (84), (85) connected to receive circuit-specific messages (62) from one of the data links (15), for disassembling circuit-specific messages (62) into slot-specific messages (70), the circuit-specific messages (70) being those for which the network station (12b) is the destination-network station, and for providing the slot-specific messages (70) to the terminal ports (18b).

5. A network station (12b) as in claim 4 wherein the routing means (86), (83), (14) additionally comprises:

D. means (84b) for determining when a circuit-specific message (62) has reached the destination network station, by comparing the destination field (63) with the distance indicator field (54); and E. means for incrementing the distance indicator field (54) when a circuit-specific message (62) is routed to the next neighboring network station (12) in the daisy chain.

6. A network station (12b) as in claim 4 wherein the routing means (86), (83), (14) additionally comprises:

F. a plurality of message forwarding queues (88), with one outgoing message queue (88) associated with each possible source network station (12);

G. means, coupled to the circuit-specific message assembling means (86), (89), for storing each circuit-specific message (62) in its respective outgoing message queue (88) according to the value of its destination address field (63); and H. means (83a), (83b), coupled to the outgoing message queues (88), for reading circuit-specific messages (62) from successive outgoing message queues (88), and routing the circuit-specific messages (62) so read onto the network (10).

7. A network station (12b) as in claim 4 wherein the data links (15) are of various speeds, and the means for assembling circuit-specific messages (86), (89) further limits the size of each slot-specific message (62) so that the maximum message transmission time is equal for all possible message routes in the network (10).

8. A network station (12b) adapted for interconnection in a wide-area network (10) with other network stations (12), the network (10) formed by interconnecting network stations (12) using a plurality of data links (15) in a daisy chain, the network station (12b) communicating with other network stations (12) by exchanging circuit-specific messages (62) over the data links (15), the network station (12b) also connected to a plurality of terminal ports (18b), the network station (12b) thus interconnecting the plurality of terminal ports (18b) to other terminal ports (18) associated with other network stations (12), and the terminal ports (18b) communicating with one another by exchanging slot-specific messages (70), the network station (12b) comprising:

A. means, (89), (86) connected to receive slot-specific messages (70) from the plurality of terminal ports (18b), for assembling circuit-specific messages (62) therefrom, each circuit-specific message (62) including slot-specific messages (70) intended for transmission to one or more terminal ports (18) associated with a single destination network station (12), the slot-specific messages (70) including a slot message type field (75) containing local area network protocol instructions that are exchanged between the terminal ports (18), and each circuit-specific message (62) including a destination address field (63) and a slot mask (68), the destination field (63) indicating the address of the destination network station (12), and the slot mask (68) indicating which of the ports (18) associated with the destination network station (12) is to receive which one of the slot-specific messages (70);

B. means for routing the circuit-specific messages (62) assembled by the means (89), (86) for assembling circuit-specific messages (62) onto one of the data-links (15); and C. means (82), (84), (85), connected to receive circuit-specific messages (62) from one of the data links (15), for disassembling circuit-specific messages (62) into slot-specific messages (70), the circuit-specific messages (62) being those for which the network station (18b) is the destination-network station, and for providing the slot-specific messages (70) to the terminal ports (18).

9. A network station (12b) as in claim 8 wherein the slot mask (68) includes a bit for each of the ports (18) associated with the destination network station for which the circuit-specific message (62) is intended, with a bit set when the circuit-specific message (62) contains a corresponding slot-specific message (70), and the bit cleared when it does not contain a slot-specific message (70).

10. A network station (12b) as in claim 8 wherein each circuit-specific message (62) includes a plurality of slot header fields (72), the number of slot header fields (72) equal to the number of slot-specific messages (70) in the circuit-specific message (62).

11. A network station (12b) as in claim 10 wherein the slot header fields (72) additionally include the slot message type field (75).

12. A network (10) for connecting two or more stations (12) in series, each station (12) adapted for connection to receive slot data (70) from a plurality of ports (18), and an indication of destination ports (18) for the slot data (70), the network (10) comprising:
   A. transmitting station means (86), (14a) for forming a message (62) containing slot data (70), a destination field (60) containing a value indicating the number of stations through which the message must pass before reaching a destination station, and a distance field (54) containing a predetermined initial value;
   B. link means (15) for communicating the message (62) over the network from the transmitting station 86, (14a) to a receiving station (14b), (85); and
   C. receiving station means (14b), (85) for receiving the message (62) that includes the distance field (54) and the destination field (63), for incrementing the value in the distance field (54), and for forwarding the message (62) along the network (10) only if the values in the distance and destination fields are not equal.

13. A network station (12b) as in claim 8 wherein the routing means (86), (83), (14) additionally comprises:
   F. a plurality of message forwarding queues (88), with one outgoing message queue (88) associated with each possible source network station (12);
   G. means, coupled to the circuit-specific message assembling means (86), (89) for storing each circuit-specific message (62) in its respective outgoing message queue (88) according to the value of its destination address field (63); and
   H. means (83a), (83b), coupled to the outgoing message queues (88), for reading circuit-specific messages (62) from successive outgoing message queues (88), and routing the circuit-specific messages (62) so read onto the network (10).

14. A network station (12b) as in claim 8 wherein the data links (15) are of various speeds, and the means for assembling circuit-specific messages (86), (89) further limits the size of each slot-specific message (62) so that the maximum message transmission time is equal for all possible message routes in the network (10).

15. A network station as in claim 6 wherein the number of data bytes in a slot-specific message (70) is selected depending upon the speed of the data links (15) over which the slot-specific message (70) is expected to travel, and selected such that the transmission time of the slot-specific message (70) is independent of the link speed.

16. A network station as in claim 8 wherein the number of data bytes in a slot-specific message (70) is selected depending upon the speed of the data links (15) over which the slot-specific message (70) is expected to travel, and selected such that the transmission time of the slot-specific message (70) is independent of the link speed.

* * * * *